United States Patent
Guo et al.

(10) Patent No.: US 12,273,824 B2
(45) Date of Patent: Apr. 8, 2025

(54) DYNAMIC ACTIVATION OF NETWORK HARDWARE BASED ON REAL-TIME CONDITIONS

(71) Applicant: Apple Inc., Cupertino, CA (US)

(72) Inventors: Xuan Guo, Glen Rock, NJ (US); Xu Zhao, Edison, NJ (US); Mohamed L Haidara, New Providence, NJ (US); Syed A Rahim, Allen, TX (US); Baohua Zheng, San Diego, CA (US); Wenping Lou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/642,293

(22) Filed: Apr. 22, 2024

(65) Prior Publication Data

US 2024/0276390 A1 Aug. 15, 2024

Related U.S. Application Data (63) Continuation of application No. 17/878,826, filed on Aug. 1, 2022, now Pat. No. 12,010,631.

(51) Int. Cl.
*H04W 52/24* (2009.01)

(52) U.S. Cl.
CPC .................. *H04W 52/24* (2013.01)

(58) Field of Classification Search
CPC ................................................. H04W 52/24
See application file for complete search history.

(56) References Cited

U.S. PATENT DOCUMENTS

| | | | |
|---|---|---|---|
| 8,451,929 B2 * | 5/2013 | Agee ................... | H04B 7/10 375/267 |
| 9,585,042 B2 * | 2/2017 | Parkvall ............... | H04W 72/542 |
| 10,492,105 B1 * | 11/2019 | Yuan ..................... | H04W 36/26 |
| 11,026,185 B2 * | 6/2021 | Takata ................ | H04W 52/325 |
| 11,109,276 B2 * | 8/2021 | Yuan .................... | H04L 65/1069 |
| 11,470,514 B2 * | 10/2022 | Mallikarjunan .... | H04W 36/026 |
| 11,558,881 B2 * | 1/2023 | Simonen ............... | H04W 72/20 |
| 12,010,631 B2 * | 6/2024 | Guo ..................... | H04W 52/367 |
| 2008/0137577 A1 * | 6/2008 | Habetha ................ | H04W 52/24 370/337 |
| 2008/0253336 A1 * | 10/2008 | Parkvall ............... | H04W 72/21 370/335 |
| 2009/0080557 A1 * | 3/2009 | Wilhelmsson ........ | H04L 1/0045 375/267 |

(Continued)

FOREIGN PATENT DOCUMENTS

WO 2022151433 A1 7/2022

*Primary Examiner* — Hai V Nguyen
(74) *Attorney, Agent, or Firm* — Fletcher Yoder PC (57) ABSTRACT

User equipment includes a first antenna, a second antenna, a first transceiver coupled to the first antenna, a second transceiver coupled to the second antenna, and processing circuitry communicatively coupled to the first transceiver and the second transceiver. The first transceiver receives or transmits a first signal via the first antenna, and the second transceiver receives or transmits a second signal via the second antenna. The processing circuitry receives an indication that a signal characteristic of the first signal is less than a first threshold, and decreases power to the first antenna, the first receiver, or both, based on the signal characteristic of the first signal being less than the first threshold.

20 Claims, 4 Drawing Sheets

(56) References Cited

U.S. PATENT DOCUMENTS

| | | | |
|---|---|---|---|
| 2012/0032876 A1* | 2/2012 | Tabe | H01Q 1/245 455/571 |
| 2013/0243075 A1* | 9/2013 | Dalela | H04L 65/752 375/E7.026 |
| 2014/0194134 A1* | 7/2014 | Byun | H04W 52/367 455/452.1 |
| 2014/0269492 A1* | 9/2014 | Forenza | H04B 7/0452 370/328 |
| 2016/0037369 A1* | 2/2016 | Parkvall | H04L 1/0026 370/252 |
| 2017/0195964 A1* | 7/2017 | Smaini | H04W 52/0235 |
| 2019/0110329 A1* | 4/2019 | Tang | H04W 72/542 |
| 2020/0092755 A1* | 3/2020 | Yuan | H04L 1/0007 |
| 2020/0338710 A1* | 10/2020 | Cheung | G05B 15/02 |
| 2021/0117368 A1* | 4/2021 | Sevindik | H04W 76/15 |
| 2021/0144681 A1 | 5/2021 | Gulati et al. | |
| 2021/0250105 A1* | 8/2021 | Wang | H04B 17/103 |
| 2021/0385707 A1* | 12/2021 | Saad | H04W 24/04 |
| 2021/0410030 A1* | 12/2021 | Venkataraman | H04W 52/242 |
| 2022/0078660 A1* | 3/2022 | Li | H04L 1/0002 |
| 2022/0150038 A1* | 5/2022 | Lee | H04L 5/0048 |
| 2022/0159539 A1* | 5/2022 | Garg | H04W 36/0079 |
| 2022/0201783 A1* | 6/2022 | Jones | H04L 5/0098 |
| 2022/0369125 A1* | 11/2022 | Chisci | H04B 7/0695 |
| 2022/0377759 A1* | 11/2022 | Simonen | H04W 72/20 |
| 2022/0407573 A1* | 12/2022 | Dou | H01Q 21/28 |
| 2023/0013274 A1* | 1/2023 | Garg | H04W 36/0079 |
| 2023/0073098 A1* | 3/2023 | Akhtar | H04L 65/1016 |
| 2023/0087488 A1* | 3/2023 | Li | H04B 17/345 |
| 2023/0099276 A1* | 3/2023 | Saad | H04B 17/318 370/329 |
| 2023/0101116 A1* | 3/2023 | Li | H04W 52/241 |
| 2023/0217312 A1* | 7/2023 | Atawia | H04W 24/08 370/252 |
| 2023/0246663 A1* | 8/2023 | Va | H04W 52/30 342/52 |
| 2023/0262602 A1* | 8/2023 | Va | H04W 52/0258 370/311 |
| 2023/0354217 A1* | 11/2023 | Bae | H04W 52/367 |
| 2023/0362692 A1* | 11/2023 | Shrestha | H04B 7/18513 |
| 2023/0367833 A1* | 11/2023 | Kol | H04L 63/0227 |
| 2023/0387976 A1* | 11/2023 | Elhadeedy | H04B 7/0834 |
| 2023/0387979 A1* | 11/2023 | Scott | H04B 7/0877 |
| 2023/0402173 A1* | 12/2023 | Lee | G16H 50/20 |
| 2023/0413085 A1* | 12/2023 | Zou | H04L 43/026 |
| 2024/0012785 A1* | 1/2024 | Sevindik | H04W 76/15 |
| 2024/0040514 A1* | 2/2024 | Guo | H04W 52/245 |

* cited by examiner

DYNAMIC ACTIVATION OF NETWORK HARDWARE BASED ON REAL-TIME CONDITIONS

CROSS-REFERENCE TO RELATED APPLICATION

This application is a continuation of U.S. application Ser. No. 17/878,826, entitled "DYNAMIC ACTIVATION OF NETWORK HARDWARE BASED ON REAL-TIME CONDITIONS," filed on Aug. 1, 2022, which is herein incorporated by reference in its entirety.

BACKGROUND

The present disclosure relates generally to managing network connectivity of user equipment, and more specifically to dynamically activating and/or reactivating network hardware of user equipment based on real-time conditions.

User equipment (e.g., a mobile communication device) may include one or more transmitters coupled to one or more antennas to enable the user equipment to receive and transmit wireless signals. For instance, certain types of user equipment may include a first antenna to receive and transmit wireless signals via a first communication network (e.g., a fourth generation (4G) or a Long Term Evolution (LTE) network) and a second antenna to receive and transmit wireless signals via a second communication network (e.g., a fifth generation (5G) or a New Radio (NR) network). However, under certain conditions, the user equipment may experience interruptions in data communication over one or more of the networks. For example, the user equipment may experience low data throughput via the networks such that certain webpages and/or web applications viewed via the user equipment may not load. Additionally, the user equipment may have hardware and/or network limitations that prevent the user equipment from resolving such issues.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment includes a first antenna, a second antenna, a first transceiver coupled to the first antenna, a second transceiver coupled to the second antenna, and processing circuitry communicatively coupled to the first transceiver and the second transceiver. The first transceiver receives or transmits a first signal via the first antenna, and the second transceiver receives or transmits a second signal via the second antenna. The processing circuitry receives an indication that a signal characteristic of the first signal is less than a first threshold, and decreases power to the first antenna, the first receiver, or both, based on the signal characteristic of the first signal being less than the first threshold.

In another embodiment, a method includes receiving, via an antenna of user equipment, a signal from a first communication network and receiving, via processing circuitry of the user equipment, a first indication that a signal characteristic of the signal is less than a first threshold. The method also includes receiving, via the processing circuitry, a second indication that a transmit power of the antenna is greater than or equal to the a second threshold, and deactivating, via the processing circuitry, the antenna, a transceiver associated with the antenna, or both, based on the signal characteristic of the signal being less than the first threshold.

In yet another embodiment, one or more tangible, non-transitory, computer-readable media stores computer-readable instructions that causes one or more processors of user equipment to receive an indication that a signal characteristic of a signal received from a first network is less than a first threshold. The signal is received by a first antenna and a first transceiver of the user equipment. The user equipment is configured to satisfy a data uplink threshold associated with the first network based on a network setting defined by a network provider of the first network. The computer-readable instructions also causes the processors of the user equipment to deactivate the antenna, the transceiver, or both, in response to determining that the signal characteristic of the signal is less than the first threshold.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "communicate" may include both transmission and reception of signals (e.g., wireless signals).

This disclosure is directed to managing network connectivity of user equipment for wireless communication. As discussed above, user equipment (e.g., a mobile communication device) may include one or more transmitters coupled to one or more antennas to enable the user equipment to receive and transmit wireless signals. For instance, certain types of user equipment may include a first antenna to receive and transmit wireless signals via a first communication network (e.g., a fourth generation (4G) or a Long Term Evolution (LTE) network) and a second antenna to receive and transmit wireless signals via a second communication network (e.g., a fifth generation (5G) or a New Radio (NR) network). However, under certain conditions, the user equipment may experience interruptions in data communication over one or more of the networks. For example, the user equipment may experience low data throughput via one or more networks at the edge of a cell or a coverage area supported by a base station. If the user equipment is far away from a base station of the second communication network, the user equipment may experience intermittent data stall and low data throughput. In such areas, the user equipment may not be able to load certain webpages and/or web applications or may slowly load the webpages and/or web applications.

Additionally, certain types of user equipment may experience hardware and/or network limitations that prevent the user equipment from switching to another network for continued data transmission and/or reception. In particular, certain configurations of the user equipment and/or certain settings of a network provider may prevent the user equipment from switching between a first communication network (e.g., 5G/NR network) and a second communication network (e.g., a 4G/LTE network) for data communication (e.g., transmission and/or reception of signals carrying data). For example, certain types of user equipment may include a single antenna (or a single set of antennas) assigned to the first communication network and a single antenna (or a single set of antennas) assigned to the second communication network. Accordingly, such types of user equipment may be unable to utilize an additional antenna to strengthen the signal connection to the first communication network. Further, one or more settings of a network provider may prioritize an initial data connection to the first communication network over the second communication network. That is, one or more settings of the network provider may force the user equipment to satisfy a data uplink threshold (e.g., 10,000 bytes or more, 20,000 bytes or more, 50,000 bytes or more, 51,200 bytes or more, and so on) to the first wireless communication network before the user equipment is permitted to switch to the second wireless communication network for data communication. Thus, the user equipment may continuously fail to satisfy the data uplink threshold to the first communication network if network connectivity to the first communication network is poor, thereby preventing the user equipment from switching to the second communication network for data communication.

Accordingly, the disclosure relates to dynamically deactivating or reactivating network hardware of the user equipment (e.g., a transceiver and/or an antenna) based on real-time, network conditions. In particular, the user equipment may continuously monitor a signal characteristic of a first network signal (e.g., an uplink data rate, a signal quality, a signal power) received by the user equipment for data communication over a first communication network. If the user equipment determines that the signal characteristic of the first network signal is below a first threshold, the user equipment may deactivate network hardware associated with the first network signal used to receive and/or transmit the first network signal. Thereafter, the user equipment may use different network hardware (e.g., a second transceiver and/or a second antenna) used to receive and/or transmit a second network signal for data communication over a second communication network. Additionally, the user equipment may continue to monitor the signal characteristic of the first network signal. In particular, if the user equipment determines that the signal characteristic of the first network signal is above a second threshold, the user equipment may reactivate the network hardware associated with the first network signal and use the network hardware for data communication over the first communication network. In some embodiments, the first communication network is a 5G/NR network, and the second communication network is a 4G/LTE network. However, it should be understood that while the present disclosure may use 4G/LTE and 5G/NR as example specifications or standards of the first communication network and the second communication network, the embodiments disclosed herein may apply to other suitable wireless communication networks (e.g., such as third generation (3G), sixth generation (6G), beyond 6G, Wi-Fi, and so on). In this way, the user equipment may continuously monitor real-time, network conditions and dynamically reconfigure the network hardware of the user equipment for data communication over the network having the best signal characteristic (e.g., uplink data rate, signal power, signal quality) at a particular point in time. In particular, the user equipment may maintain network connectivity by switching from using the first communication network (e.g., a 5G/NR network) as the primary network for receiving and/or transmitting data to the second communication network (e.g., a 4G/LTE network) under conditions in which the data connection between the user equipment and the first communication network is poor. Thereafter, the user equipment may switch from using the second communication network as the primary network for receiving and/or transmitting data to the first communication network under conditions in which the data connection between the user equipment and the first communication network has improved.

Figure 1:
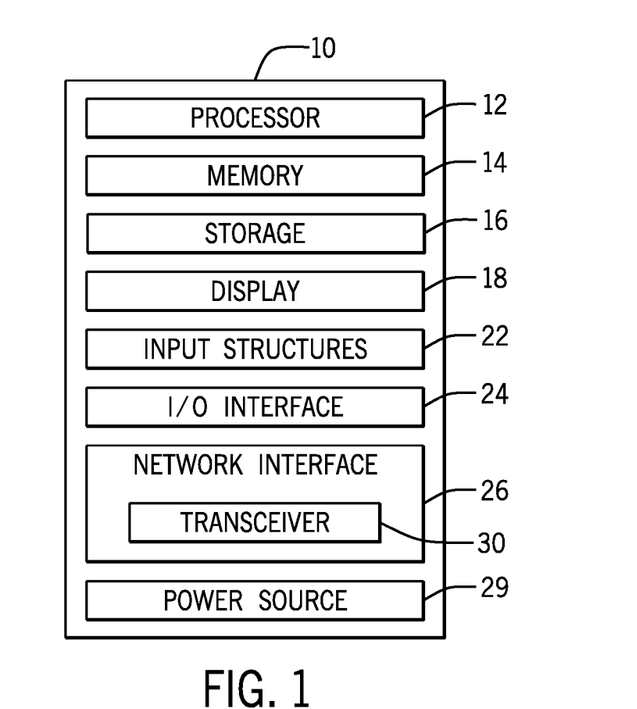
FIG. 1 is a block diagram of user equipment, according to embodiments of the present disclosure.

FIG. 1 is a block diagram of user equipment 10 (e.g., an electronic device, a wireless communication device, a mobile communication device, and so on), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, the memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic device or a handheld electronic device, such as a wireless electronic device or smartphone (e.g., in the form of a model of an iPhone® available from Apple Inc. of Cupertino, California), a tablet (e.g., in the form of a model of an iPad® available from Apple, Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 2 may be a single contained processing module or may be incorporated wholly or partially within any of the other elements within the user equipment 12. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processor 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 12 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a third generation (3G) cellular network, a universal mobile telecommunication system (UMTS), a fourth generation (4G) cellular network, a long term evolution (LTE®) cellular network, a long term evolution licenses assisted access (LTE-LAA) cellular network, a fifth generation (5G) cellular network, and/or New Radio (NR) cellular network, a sixth generation (6G) or greater than 6G cellular network, a satellite network, a non-terrestrial network, and so on. In particular, the network interface 26 may include, for example, one or more interfaces for using a cellular communication standard of the 5G specifications that include the millimeter (mmWave) frequency range (e.g., 24.25-300 gigahertz (GHz)) and/or any other cellular communication standard release (e.g., Release-15, Release-16, Release-17, any future releases) that define and/or enable frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the user equipment 10 may include any suitable source of power, such as a rechargeable lithium polymer (Li-poly) battery and/or an alternating (AC) power converter.

Figure 2:
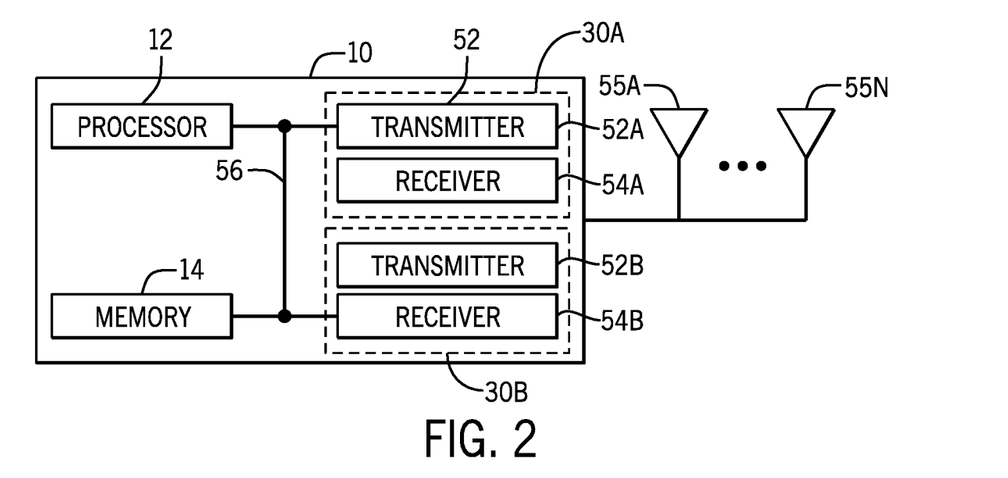
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, first and second transceivers 30A and 30B (collectively 30), first and second transmitters 52A and 52B (collectively 52), first and second receivers 54A and 54B (collectively 54), and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitters 52 and/or the receivers 54 that respectively enable transmission and reception of data between the user equipment 10 and an external device via, for example, a network (e.g., including access points or base stations, such as NodeBs, eNBs, or eNodeBs (Evolved NodeBs or E-UTRAN (Evolved Universal Mobile Telecommunication System (UMTS) Terrestrial Radio Access Network) NodeBs, or gNodeBs (e.g., Next Generation NodeB)) or a direct connection. As illustrated, the transmitters 52 and the receivers 54 may be combined into the transceivers 30. The user equipment 10 may also have one or more antennas 55A-55N electrically coupled to the transceivers 30. For example, the user equipment 10 may use a first antenna 55A to receive and/or transmit wireless signals via a first communication network (e.g., a 4G or a long term evolution (LTE) network) and a second antenna 55N to receive and/or transmit wireless signals via a second communication network (e.g., a 5G or a new radio (NR) network). However, it should be understood that while the present disclosure may use 4G/LTE and 5G/NR as an example specification or standard of the first communication network and the second communication network, the embodiments disclosed herein may apply to other suitable specifications or standards (e.g., such as third generation (3G), sixth generation (6G), beyond 6G, Wi-Fi, and so on). The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas 55A-55N of an antenna group or module may be communicatively coupled to a respective transceiver 30 and each emit radio frequency signals that may constructively and/or destructively combine to form a beam.

The user equipment 10 may transmit a signal using a single transmitter (e.g., 52A or 52B) via one or more antennas 55 or transmit a signal using multiple transmitters 52A and 52B (e.g., each transmitter 52A, 52B using a respective set (e.g., one or more antennas 55)). The user equipment 10 may include more transmitters, more receivers, multiple transceivers, and/or multiple antennas as suitable for various communication standards. In some embodiments, the transmitters 52 and the receivers 54 may transmit and receive information via other wired or wireline systems or means.

As illustrated, the various components of the user equipment 10 may be coupled together by a bus system 56. The bus system 56 may include a data bus, for example, as well as a power bus, a control signal bus, a status signal bus, in addition to the data bus. The components of the user equipment 10 may be coupled together or accept or provide inputs to each other using some other mechanism.

Figure 3:
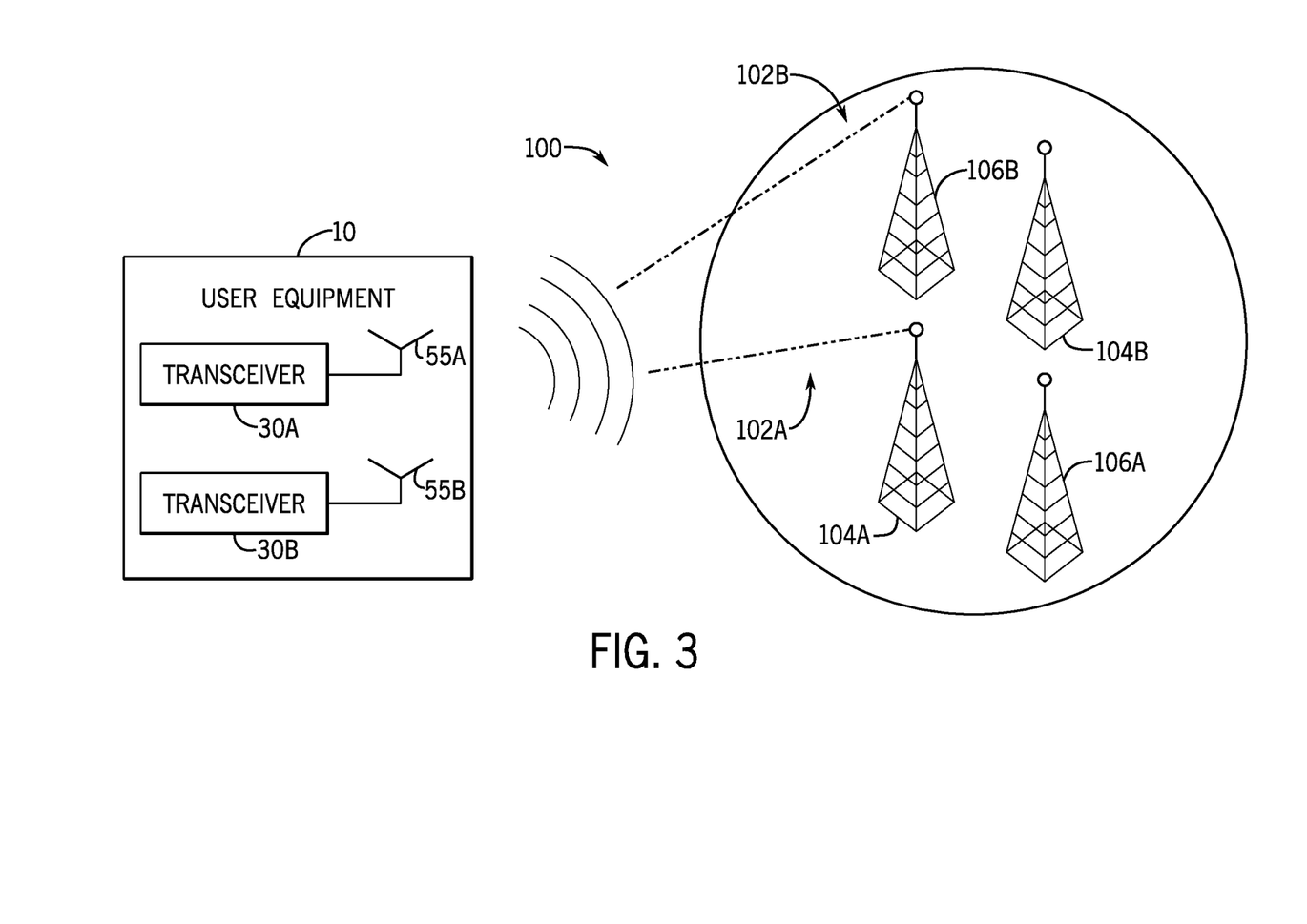
FIG. 3 is a schematic diagram of a communication system including the user equipment of FIG. 1 communicatively coupled to a wireless communication network supported by base stations, according to embodiments of the present disclosure.

FIG. 3 is a schematic diagram of a communication system 100 including the user equipment 10 of FIG. 1 communicatively coupled to a first wireless communication network 102A and a second wireless communication network 102B (collectively 102), according to embodiments of the present disclosure. As illustrated, the first wireless communication network 102 is supported by base stations 104A, 104B (collectively 104), and the second wireless communication network 102B is supported by base stations 106A, 106B. In particular, the base stations 104 may include one or more Evolved NodeB (eNodeB) base stations and may provide first network (e.g., 4G/LTE) coverage via the first wireless communication network 102A to the user equipment 10. Additionally, the base station 106 may include one or more Next Generation NodeB (gNodeB or gNB) base stations and may provide second network (e.g., 5G/NR) coverage via the second wireless communication network 102B to the user equipment 10. The base stations 104, 106 may include any suitable electronic device, such as a communication hub or node, that facilitates, supports, and/or implements the networks 102. Each of the base stations 104, 106 may include at least some of the components of the user equipment 10 shown in FIGS. 1 and 2, including one or more processors 12, a memory 14, a storage 16, a transceiver 30, a transmitter 52, a receiver 54. It should be understood that while the present disclosure may use 4G/LTE and 5G/NR as example specifications or standards of the first wireless communication network 102A and the second wireless communication network 102B, the embodiments disclosed herein may apply to other suitable specifications or standards (e.g., such as third generation (3G), sixth generation (6G), beyond 6G, Wi-Fi, and so on). Moreover, the networks 102 may include any suitable number of base stations 104, 106 (e.g., one or more base stations 104, 106, four or more base stations 104, 106, ten or more base stations 104, 106, and so on).

As illustrated, the user equipment 10 includes the transceivers 30. The transceivers 30 include the transmitters 52 and the receivers 54 that respectively enable transmission and reception of data between the user equipment 10 and the base stations 104 via the antennas 55. In certain embodiments, the transmitter 52A of the transceiver 30A may transmit data to a first communication network 102A (e.g., 4G/LTE) via a first antenna 55A, and the receiver 54A of the transceiver 30A may receive data from the first wireless communication network 102A via the first antenna 55A. Additionally, the transmitter 52B of the transceiver 30B may transmit data to a second communication network 102B (e.g., 5G/NR) via a second antenna 55B, and the receiver 54B of the transceiver 30B may receive data from the second communication network 102B via the second antenna 55B.

As mentioned above, under certain conditions, the user equipment 10 may experience interruptions in data communication over one or more of the networks 102A, 102B. For example, the user equipment 10 may experience low data throughput via the second wireless communication network 102B at the edge of a cell or a coverage area supported by the corresponding base station 104B. Additionally, certain types of user equipment 10 may experience hardware and/or network limitations that prevent the user equipment 10 from switching to another network (e.g., the first wireless communication network 102A) for continued data transmission and/or reception. In particular, certain configurations of the user equipment 10 and/or certain settings of a network provider may prevent the user equipment 10 from switching between the second wireless communication network 102B and the first wireless communication network 102A for data communication. First, the user equipment 10 may include a single (e.g., no more than one) antenna 55A to connect to the first wireless communication network 102A and a single (e.g., no more than one) antenna 55B to connect to the second wireless communication network 102B. Accordingly, the user equipment 10 may be unable to utilize an additional antenna to strengthen the data connection of the user equipment 10 to the second wireless communication network 102B. Second, the network provider may prioritize an initial data connection to the second wireless communication network 102B over the first wireless communication network 102A. That is, one or more settings of the network provider may force the user equipment 10 to satisfy a data uplink threshold (e.g., 10,000 bytes or more, 20,000 bytes or more, 50,000 bytes or more, 51,200 bytes or more, and so on) to the second wireless communication network 102B before the user equipment 10 is permitted to switch to the first wireless communication network 102A for data communication. For example, the user equipment 10 may prevent, block, or interrupt reception or transmission of a signal of the first wireless communication network 102A before the data uplink threshold to the second wireless communication network 102B is satisfied while the second antenna 55B, the second transceiver 30B, or both, are activated. Thus, the user equipment 10 may continuously fail to satisfy the data uplink threshold to the second wireless communication network 102B, thereby preventing the user equipment 10 from switching to the first wireless communication network 102A for data transmission and/or reception.

Accordingly, the user equipment 10 may continuously monitor a signal characteristic of a first network (e.g., 5G/NR) signal received by the user equipment 10 for receiving data over the first network 102A. If the user equipment 10 determines that the signal characteristic of the first network signal is below a first threshold, the user equipment 10 may deactivate network hardware (e.g., the transceiver 30B and/or the antenna 55B) used to transmit and/or receive data over the 5G/NR network 102B. Thereafter, the user equipment 10 may use different network hardware (e.g., the transceiver 30A and/or the antenna 55A) to receive and/or transmit a second network (e.g., 4G/LTE) signal over the second network 102B. Additionally, the user equipment 10 may continue to monitor the signal characteristic of the first network signal. In particular, if the user equipment 10 determines that the signal characteristic of the first network signal is above a second threshold, the user equipment 10 may reactivate the network hardware (e.g., the transceiver 30B and/or the antenna 55B) for receiving and/or transmitting a first network signal over the first network 102A. It should be understood that while the present disclosure may use 4G/LTE and 5G/NR as example specifications or standards of the first network 102A and the second network 102B, the embodiments disclosed herein may apply to other suitable specifications or standards (e.g., such as third generation (3G), sixth generation (6G), beyond 6G, Wi-Fi, and so on). In this way, the user equipment 10 may continuously monitor real-time, network conditions and dynamically reconfigure the network hardware of the user equipment 10 for transmitting and/or receiving data over the network (e.g., 102A, 102B) that has the best signal characteristic (e.g., uplink data rate, signal quality, signal power) at a particular point in time. That is, the user equipment 10 may maintain network connectivity by switching from using the first network 102A as the primary network for receiving and/or transmitting data to the second network 102B under conditions in which the data connection between the user equipment and the first network 102A is poor.

Figure 4:
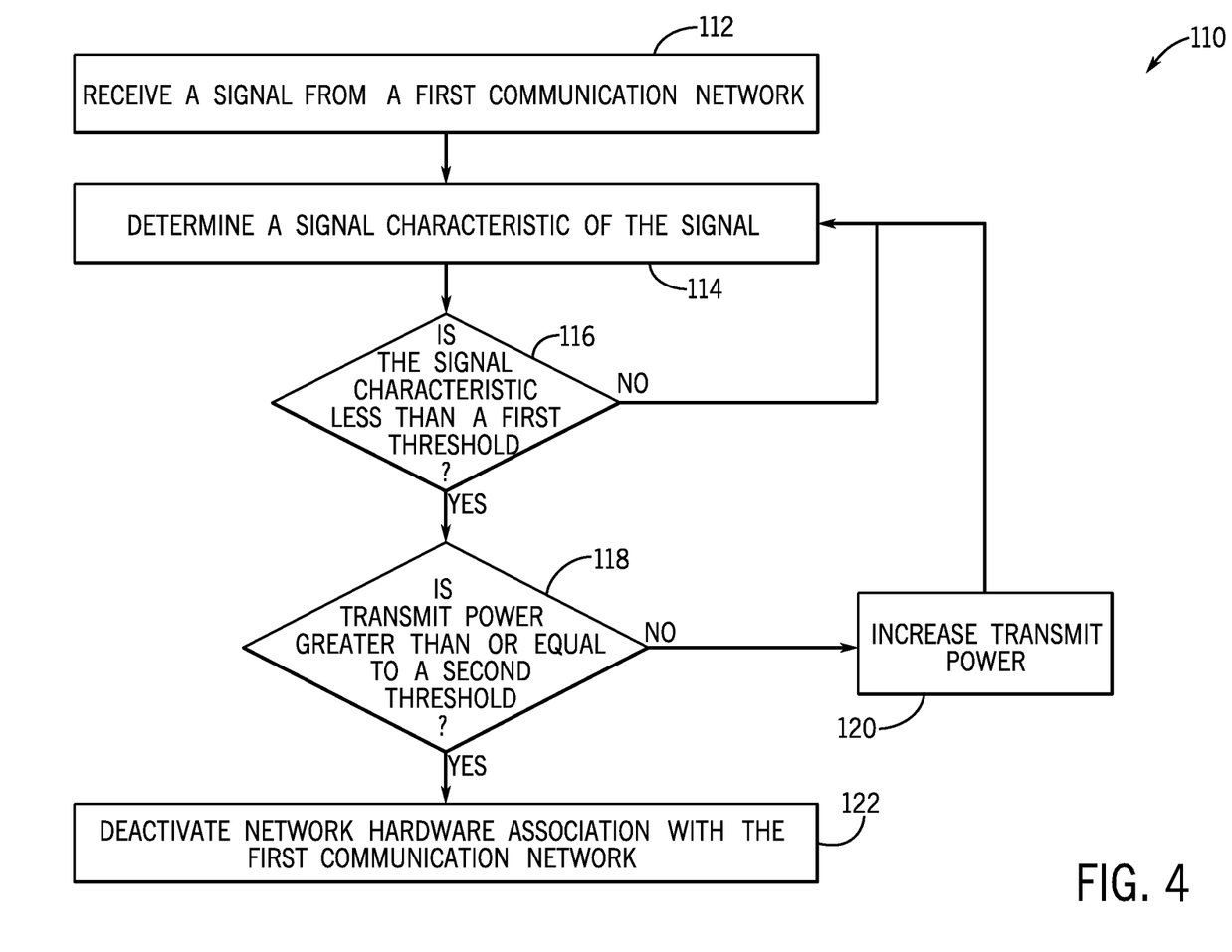
FIG. 4 is a flowchart of a method for deactivating network hardware of the user equipment of FIG. 1 based on real-time network conditions, according to embodiments of the present disclosure.

With the foregoing in mind, FIG. 4 is a flowchart of a method 110 for deactivating network hardware of the user equipment 10 used to communicate (e.g., transmit and/or receive signals) over a first communication network 102A (e.g., a 5G/NR network) based on real-time network conditions associated with the first communication network 102A, according to embodiments of the present disclosure. In particular, the user equipment 10 may deactivate an antenna 55B used to receive and/or transmit data over the first communication network 102A if a signal characteristic of the first communication network signal is lower than a first threshold. Any suitable device (e.g., a controller) that may control components of the user equipment 12, such as the processor 12, may perform the method 110. In some embodiments, the method 110 may be implemented by executing instructions stored in a tangible, non-transitory, computer-readable medium, such as the memory 14 or the storage 16, using the processor 12. For example, the method 110 may be performed at least in part by one or more software components, such as an operating system of the user equipment 10, one or more software applications of the user equipment 10, and the like. While the method 110 is described using steps in a specific sequence, it should be understood that the present disclosure contemplates that the described steps may be performed in different sequences than the sequence illustrated, and certain described steps may be skipped or not performed altogether.

Under certain conditions, the user equipment 10 may experience interruptions in data communication over the first communication network 102A. For example, the user equipment 10 may experience low data throughput via the first wireless communication network 102A at the edge of a cell or a coverage area supported by the corresponding base station 104B. Additionally, the user equipment 10 may experience hardware and/or network limitations that prevent the user equipment 10 from switching to the second communication network 102B to maintain network connectivity for receiving and/or transmitting data. In particular, the user equipment 10 may include a single (e.g., no more than one) antenna 55B to connect to the first wireless communication network 102A and a single (e.g., no more than one) antenna 55B to connect to the second wireless communication network 102A. Accordingly, the user equipment 10 may be unable to utilize an additional antenna 55A to strengthen the data connection of the user equipment 10 to the first wireless communication network 102B. Further, the network provider may prioritize an initial data connection to the first wireless communication network 102A over the second wireless communication network 102B. That is, one or more settings of the network provider may force the user equipment 10 to satisfy a data uplink threshold (e.g., 10,000 bytes or more, 20,000 bytes or more, 50,000 bytes or more, 51,200 bytes or more, and so on) to the first wireless communication network 102B before the user equipment 10 is permitted to switch to the second wireless communication network 102B for data communication.

Accordingly, the user equipment 10 may perform the method 110 before or during a period of time in which the user equipment 10 is experiencing poor network connectivity to the first communication network 102A. In process block 112, the user equipment 10 receives a first communication network signal from the first communication network 102A (e.g., a 5G/NR network) via a first antenna 55B. The user equipment 10 may also receive a second communication network signal from the second communication network 102B (e.g., a 4G/LTE network) via a second antenna 55A. For instance, the user equipment 10 may be located in a region that includes first communication network coverage by a corresponding base station 104B and second communication network coverage by a corresponding base station 104A. In process block 114, the user equipment 10 determines a signal characteristic of the first communication network signal from the first communication network 102A. In particular, the signal characteristic may include any suitable metric that provides an indication that data in the first communication network signal will be sufficiently received by the user equipment 10. In some embodiments, the signal characteristic may include an uplink data rate, a signal quality (e.g., Energy Per Chip to Interference (EC/IO), Signal-to-Interference-plus-Noise Ratio (SINR), Received Signal Code Power (RSCP), Reference Signal Received Quality (RSRQ)), a signal power (e.g., Received Signal Strength Indicator (RSSI), Reference Signals Received Power (RSRP)), and/or the like.

In process block 116, the user equipment 10 may determine if the signal characteristic of the first communication network signal is less than a first threshold. In certain embodiments, the processing circuitry of the user equipment 10 may receive an indication that the signal characteristic is less than the first threshold or not less than the first threshold from additional suitable processing circuitry of the user equipment 10 that evaluates the signal characteristic of the first communication network. If the user equipment 10 is far away from a base station 104B that provides the coverage area of the first communication network 102A, a signal characteristic (e.g., an uplink data rate, a signal quality, a signal power) of the first communication network signal received by the user equipment 10 may decrease such that the user equipment 10 experiences low data throughput or a stall in data communicated over the first communication network 102A. In certain embodiments, the first threshold may include an uplink data rate (e.g., 10,000 bytes or more, 20,000 bytes or more, 50,000 bytes or more, 51,200 bytes or more, and so on), a signal quality (e.g., two decibels (dB) to three dB, three dB to four dB, four dB to five dB), and/or a signal power (e.g., two dB to three dB, three dB to four dB, four dB to five dB). In any case, the first threshold may be fixed by a manufacturer of the user equipment 10 or be configurable at run-time.

If the user equipment 10 receives an indication that the signal characteristic is not less than the first threshold or determines that the signal characteristic is not less than the first threshold in process block 116, the user equipment 10 may continue to perform the method 110 at process blocks 114 and 116 to monitor the signal characteristic of the first communication network signal. Alternatively, if the user equipment 10 receives and indication that the signal characteristic is less than the first threshold or determines that the signal characteristic is less than the first threshold, in process block 118, the user equipment 10 determines if a transmit power of a corresponding transmitter 52B is greater than or equal to a second threshold. In certain embodiments, the processing circuitry of the user equipment 10 may receive an indication that the transmit power of the corresponding transmitter 52B is greater than or equal to the second threshold or less than the second threshold from additional suitable processing circuitry of the user equipment 10 that evaluates the transmit power. Additionally, the second threshold may be indicative of a maximum transmit power level associated with the user equipment 10. For example, the maximum transmit power level may be 10 decibel-milliwatts (dBm) or greater, 12 dBm or greater, 15 dBm or greater, 16 dBm or greater, or any other suitable value.

If the user equipment 10 receives an indication that the transmit power of the transmitter 52B is not greater than or equal to the second threshold or determines that the transmit power of the transmitter 52B is not greater than or equal to the second threshold, the user equipment 10 may increase the transmit power of the transmitter 52B in process block 120. The user equipment 10 may then perform the method 110 at process blocks 114 and 116 to determine whether the signal characteristic of the first communication network signal has improved. If the user equipment 10 determines that the signal characteristic of the first communication network signal has improved (e.g., the signal characteristic is not less than the first threshold) in process block 116, the user equipment 10 may perform the method 110 at process blocks 114 and 116 to monitor the signal characteristic of the first communication network signal. Alternatively, if the user equipment 10 receives an indication that the transmit power of the transmitter 52B is greater than or equal to the second threshold or determines that the transmit power of the transmitter 52B is greater than or equal to the second threshold, the user equipment 10 deactivates the network hardware of the user equipment 10 used to communicate over the first communication network 102A in process block 122. For example, the user equipment 10 may deactivate the transceiver 30B, the antenna 55B, and/or any other suitable network hardware, used to receive and/or transmit data over the first communication network 102A. The user equipment 10 may deactivate the transceiver 30B, the antenna 55B, and/or any other suitable network hardware by depowering the network hardware, shutting off the network hardware, turning off the network hardware, or the like. In some embodiments, the user equipment 10 may deactivate the transceiver 30B and/or the antenna 55B by degrading a gain (e.g., power) of the transceiver 30B and/or the antenna 55B, gradually decreasing a power supplied to the transceiver 30B and/or the antenna 55B, blocking power supplied to the transceiver 30B and/or the antenna 55B, or any other suitable technique.

Thereafter, the user equipment 10 may use different network hardware to communicate (e.g., transmit and/or receive signals) with a different network. As mentioned above, the user equipment 10 may receive and/or transmit data over the second communication network 102B via the transceiver 30A and the antenna 55A. In this way, the user equipment 10 may switch to the second communication network 102B under conditions in which the data connection between the user equipment 10 and the first communication network 102A is poor. Accordingly, the user equipment 10 does not continuously attempt to satisfy the data uplink threshold associated with the first communication network under conditions in which the network connectivity to the first communication network is poor, thereby reducing power consumption and increasing battery life of the user equipment 10.

Additionally, the user equipment 10 may continue to monitor the signal characteristic of the first communication network signal to determine if the network conditions associated with the first communication network 102A have improved. That is, the user equipment 10 may switch from using the second communication network 102B as the primary network for receiving and/or transmitting data to the first communication network 102A under conditions in which the data connection between the user equipment 10 and the first communication network 102A has improved. Further, as mentioned above, the user equipment 10 may include a single (e.g., no more than one) antenna 55B to connect to the first wireless communication network 102A and a single (e.g., no more than one) antenna 55B to connect to the second wireless communication network 102B. Accordingly, the user equipment 10 may be unable to utilize an additional antenna 55A to strengthen the data connection of the user equipment 10 to the first wireless communication network 102A or the second wireless communication network 102B. The network provider may also prioritize an initial data connection to the first wireless communication network 102A over the second wireless communication network 102B. That is, one or more settings of the network provider may force the user equipment 10 to satisfy a data uplink threshold (e.g., 10,000 bytes or more, 20,000 bytes or more, 50,000 bytes or more, 51,200 bytes or more, and so on) to the first wireless communication network 102A before the user equipment 10 is permitted to switch to the second wireless communication network 102B for data communication.

Figure 5:
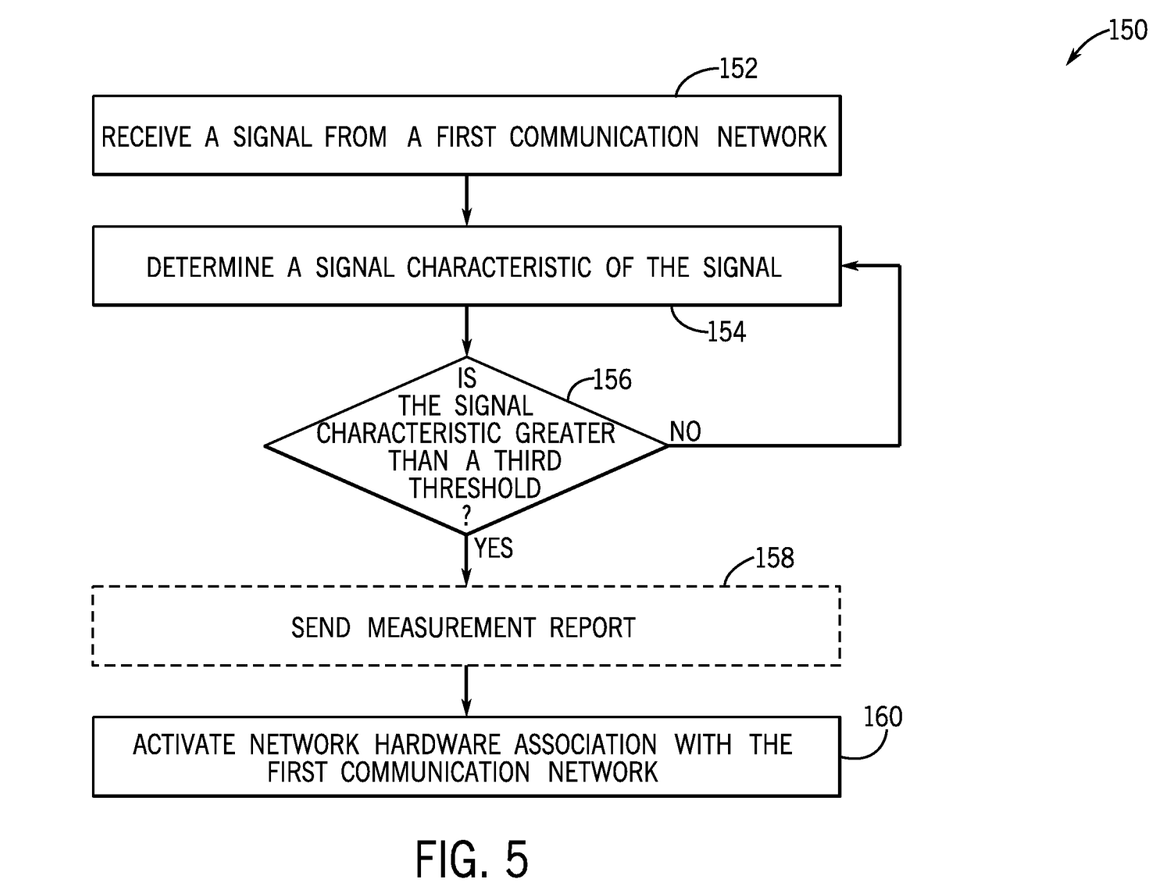
FIG. 5 is a flowchart of a method for dynamically activating network hardware of the user equipment of FIG. 1 based on real-time network conditions, according to embodiments of the present disclosure.

With the foregoing in mind, FIG. 5 is a flowchart of a method 150 for dynamically activating network hardware of the user equipment 10 used to communicate (e.g., transmit and/or receive signals) over the first communication network (e.g., a 5G/NR network 102A) based on real-time network conditions associated with the first communication network 102A, according to embodiments of the present disclosure. The method 150 may be performed by the user equipment 10 after the user equipment has perform the method 110 described above with respect to FIG. 4. In particular, the user equipment 10 may activate the transceiver 30B, the antenna 55B, and/or any other suitable network hardware, used to receive and/or transmit data over the first communication network 102A if the signal characteristic of the first communication network signal is greater than or equal to a third threshold. Any suitable device (e.g., a controller) that may control components of the user equipment 12, such as the processor 12, may perform the method 150. In some embodiments, the method 150 may be implemented by executing instructions stored in a tangible, non-transitory, computer-readable medium, such as the memory 14 or the storage 16, using the processor 12. For example, the method 150 may be performed at least in part by one or more software components, such as an operating system of the user equipment 10, one or more software applications of the user equipment 10, and the like. While the method 150 is described using steps in a specific sequence, it should be understood that the present disclosure contemplates that the described steps may be performed in different sequences than the sequence illustrated, and certain described steps may be skipped or not performed altogether.

In process block 152, the user equipment 10 receives the first communication network signal (e.g., a 5G/NR network signal) from the first communication network 102A via the first antenna 55B. For example, the user equipment 10 may intermittently supply power to the first antenna 55B to connect to the first communication network 102A. The user equipment 10 may receive the first communication network signal from the first communication network 102A via the first antenna 55B after the user equipment 10 supplies power to the first antenna 55B. In process block 154, the user equipment 10 determines a signal characteristic if the first communication network signal from the first communication network 102A. As mentioned above with respect to process block 114, the signal characteristic may include any suitable metric that provides an indication that data in the first communication network signal will be sufficiently received by the user equipment 10. In some embodiments, the signal characteristic may include an uplink data rate, a signal quality (e.g., EC/IO, SINR, RSCP, RSRQ), a signal power (e.g., RSSI, RSRP), and/or the like.

In process block 156, the user equipment 10 may determine if the signal characteristic of the first communication network signal is greater than or equal to a third threshold. In certain embodiments, the processing circuitry of the user equipment 10 may receive an indication that the signal characteristic is less than the third threshold or greater than or equal to the third threshold from additional suitable processing circuitry of the user equipment 10 that evaluates the signal characteristic of the first communication network. In particular, the third threshold may be indicative of a minimum level of a signal characteristic for receiving and/or transmitting data over the first communication network 102A. In certain embodiments, the third threshold may include an uplink data rate (e.g., 10,000 bytes or more, 20,000 bytes or more, 50,000 bytes or more, 51,200 bytes or more, and so on), a signal quality (e.g., two dB to three dB, three dB to four dB, four dB to five dB), and/or a signal power (e.g., two dB to three dB, three dB to four dB, four dB to five dB). In any case, the third threshold may be fixed by a manufacturer of the user equipment 10 or be configurable at run-time.

If the user equipment 10 receives an indication that the signal characteristic is not greater than or equal to the third threshold or determines that the signal characteristic is not greater than or equal to the third threshold in process block 156, the user equipment 10 may continue to perform the method 150 at process blocks 154 and 156 to monitor the signal characteristic of the first communication network signal. Alternatively, if the user equipment 10 receives an indication that the signal characteristic is greater than or equal to the third threshold or determines that the signal characteristic is greater than or equal to the third threshold, in optional process block 158, the user equipment 10 may send a report to the network provider, the manufacturer, or any other suitable entity. For instance, the report may include one or more signal characteristic values, one or more geographical position data (e.g., with respect to the base stations 104, 106), or the like.

In process block 160, the user equipment 10 activates the network hardware of the user equipment 10 used to communicate (e.g., transmit and/or receive signals) over the first communication network 102A after the user equipment 10 receives an indication that the signal characteristic is greater than or equal to the third threshold or determines that the signal characteristic is greater than or equal to the third threshold. For example, the user equipment 10 may activate the transceiver 30B, the antenna 55B, and/or any other suitable hardware, used to receive and/or transmit data over the first communication network 102A. The user equipment 10 may activate the transceiver 30B, the antenna 55B, and/or any other suitable network hardware by powering on the network hardware, supplying power to the network hardware, turning on the network hardware, or the like. In some embodiments, the user equipment 10 may activate the transceiver 30B and/or the antenna 55B by increasing a gain of the transceiver 30B and/or the antenna 55B, gradually increasing a power supplied to the transceiver 30B and/or the antenna 55B, unblocking power supplied to the transceiver 30B and/or the antenna 55B, or any other suitable technique. Thereafter, the user equipment 10 may receive and/or transmit data over the first communication network 102A via the transceiver 30B and the antenna 55B. In this way, the user equipment 10 may switch from receiving and/or transmitting data over the second communication network 102B to the first communication network 102A, or the first communication network 102A to the second communication network 102B, based on real-time, network conditions.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. User equipment, comprising:
a first antenna and a second antenna;
a first transceiver coupled to the first antenna;
a second transceiver coupled to the second antenna; and
processing circuitry communicatively coupled to the first transceiver and the second transceiver, the processing circuitry configured to:
increase power to the first antenna or the first transceiver; and
receive an indication that a signal characteristic is greater than a first threshold, and
receive or transmit a first signal via the first antenna based on the signal characteristic of the first signal being greater than the first threshold.

2. The user equipment of claim 1, wherein the processing circuitry is configured to decrease power to the first antenna or the first transceiver based on the signal characteristic being less than the first threshold.

3. The user equipment of claim 1, wherein the user equipment consists of only the first antenna and the second antenna.

4. The user equipment of claim 1, wherein the processing circuitry is configured to satisfy an upload data threshold associated with a first network based on a network setting defined by a network provider of the first network and a second network.

5. The user equipment of claim 4, wherein the processing circuitry is configured to prevent reception or transmission of a second signal via the second antenna before satisfying the upload data threshold associated with the first network while the first antenna or the first transceiver is activated.

6. The user equipment of claim 5, wherein the first signal comprises a 5G signal or a New Radio (NR) signal.

7. The user equipment of claim 6, wherein the second signal comprises a 4G signal or a Long Term Evolution (LTE) signal.

8. A method, comprising:
intermittently activating, via processing circuitry of user equipment, an antenna of the user equipment or a transceiver associated with the antenna and receiving, via the antenna, a signal from a first communication network;
receiving, via the processing circuitry, a first indication that a signal characteristic of the signal is greater than a first threshold; and
activating, via the processing circuitry, the antenna or the transceiver based on the signal characteristic of the signal being greater than the first threshold.

9. The method of claim 8, comprising receiving or transmitting, via the transceiver and the antenna, a second signal after activating, via the processing circuitry, the antenna or the transceiver.

10. The method of claim 8, comprising deactivating, via the processing circuitry, the antenna or the transceiver prior to intermittently activating, via the processing circuitry, the antenna or the transceiver.

11. The method of claim 10, comprising receiving or transmitting, via a second transceiver and a second antenna, a second signal while the antenna or the transceiver is deactivated.

12. The method of claim 11, wherein receiving or transmitting, via the second transceiver and the second antenna, the second signal occurs over a first network.

13. The method of claim 12, comprising receiving or transmitting, via the transceiver and the antenna, a third signal over a second network after activating, via the processing circuitry, the antenna or the transceiver.

14. The method of claim 8, wherein activating, via the processing circuitry, the antenna or the transceiver comprises increasing a power supplied to the antenna or the transceiver, or increasing a gain of the antenna or the transceiver.

15. One or more tangible, non-transitory, computer-readable media, storing computer-readable instructions configured to cause one or more processors of user equipment to:
receive an indication that a signal characteristic of a signal received from a first network is greater than a threshold, the signal being received by a first antenna and a first transceiver of the user equipment; and
activate the first antenna or the first transceiver based on the signal characteristic of the signal being greater than the threshold.

16. The one or more tangible, non-transitory, computer-readable media of claim 15, wherein the signal characteristic comprises an uplink data rate, a signal quality, a signal power, or any combination thereof.

17. The one or more tangible, non-transitory, computer-readable media of claim 15, wherein the computer-readable instructions cause the one or more processors to deactivate the first antenna or the first transceiver prior to receiving the indication that the signal characteristic of the signal received from the first network is greater than the threshold.

18. The one or more tangible, non-transitory, computer-readable media of claim 17, wherein the computer-readable instructions cause the one or more processors to transmit or receive, via a second antenna of the user equipment, a second signal to or from a second network after deactivating the first antenna or the first transceiver.

19. The one or more tangible, non-transitory, computer-readable media of claim 17, wherein the user equipment is unable to transmit or receive, via a second antenna of the user equipment, a second signal to a second network before satisfying a data uplink threshold associated with the first network while the first antenna or the first transceiver is activated.

20. The one or more tangible, non-transitory, computer-readable media of claim 15, wherein the computer-readable instructions cause the one or more processors to transmit or receive, via the first antenna and the first transceiver, a second signal after activating the first antenna or the first transceiver.

* * * * *